(12) United States Patent
Potolicchio

(10) Patent No.: US 10,858,973 B2
(45) Date of Patent: Dec. 8, 2020

(54) LUBRICATION CONTROL IN INTERNAL COMBUSTION ENGINES

(71) Applicant: Miguel Alfonso Potolicchio, Coral Springs, FL (US)

(72) Inventor: Miguel Alfonso Potolicchio, Coral Springs, FL (US)

( * ) Notice: Subject to any disclaimer, the term of this patent is extended or adjusted under 35 U.S.C. 154(b) by 0 days.

(21) Appl. No.: 16/600,456

(22) Filed: Oct. 12, 2019

(65) Prior Publication Data

US 2020/0040779 A1 Feb. 6, 2020

Related U.S. Application Data

(63) Continuation of application No. 15/375,159, filed on Dec. 11, 2016, now Pat. No. 10,443,457.

(60) Provisional application No. 62/266,551, filed on Dec. 11, 2015.

(51) Int. Cl.
| *F01M 1/16* | (2006.01) |
| *F01M 1/02* | (2006.01) |
| *F01M 9/10* | (2006.01) |
| *F01M 11/02* | (2006.01) |
| *F16K 15/04* | (2006.01) |

(52) U.S. Cl.
CPC ............ *F01M 1/16* (2013.01); *F01M 1/02* (2013.01); *F01M 9/108* (2013.01); *F01M 11/02* (2013.01); *F16K 15/044* (2013.01)

(58) Field of Classification Search
CPC .......... F01M 11/02; F01M 1/16; F01M 9/102; F01M 11/03; F01M 1/06
See application file for complete search history.

(56) References Cited

U.S. PATENT DOCUMENTS

| 6,640,933 | B2 * | 11/2003 | Henry | F16C 19/06 |
| | | | | 184/5.1 |
| 8,992,089 | B2 * | 3/2015 | Raby | B23P 15/003 |
| | | | | 384/462 |
| 9,909,469 | B2 * | 3/2018 | Raby | F01M 7/00 |
| 2003/0223664 | A1 * | 12/2003 | Harui | F16C 33/10 |
| | | | | 384/433 |
| 2007/0277751 | A1 * | 12/2007 | Lin | F01M 1/02 |
| | | | | 123/41.44 |
| 2014/0037235 | A1 * | 2/2014 | Raby | F16C 33/1045 |
| | | | | 384/371 |
| 2016/0326923 | A1 * | 11/2016 | Raby | F01M 11/03 |

* cited by examiner

*Primary Examiner* — Long T Tran

(74) *Attorney, Agent, or Firm* — Thomas K. Ziegler

(57) ABSTRACT

A bearing supporting an end of a layshaft in an internal combustion engine is lubricated by injection of oil through a flange that mounts the layshaft on the engine. A pressure responsive flow control valve controls delivery of oil through the flange to the bearing. A backflow prevention adapter prevents backflow of oil to the engine's oil pump.

20 Claims, 17 Drawing Sheets

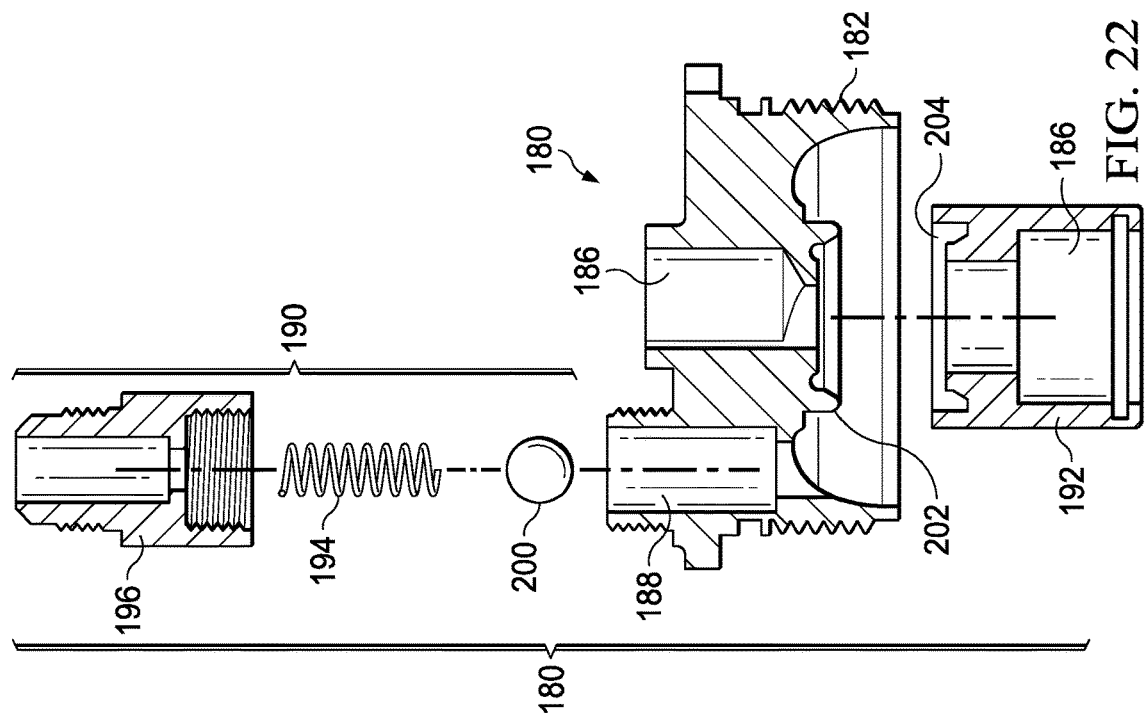
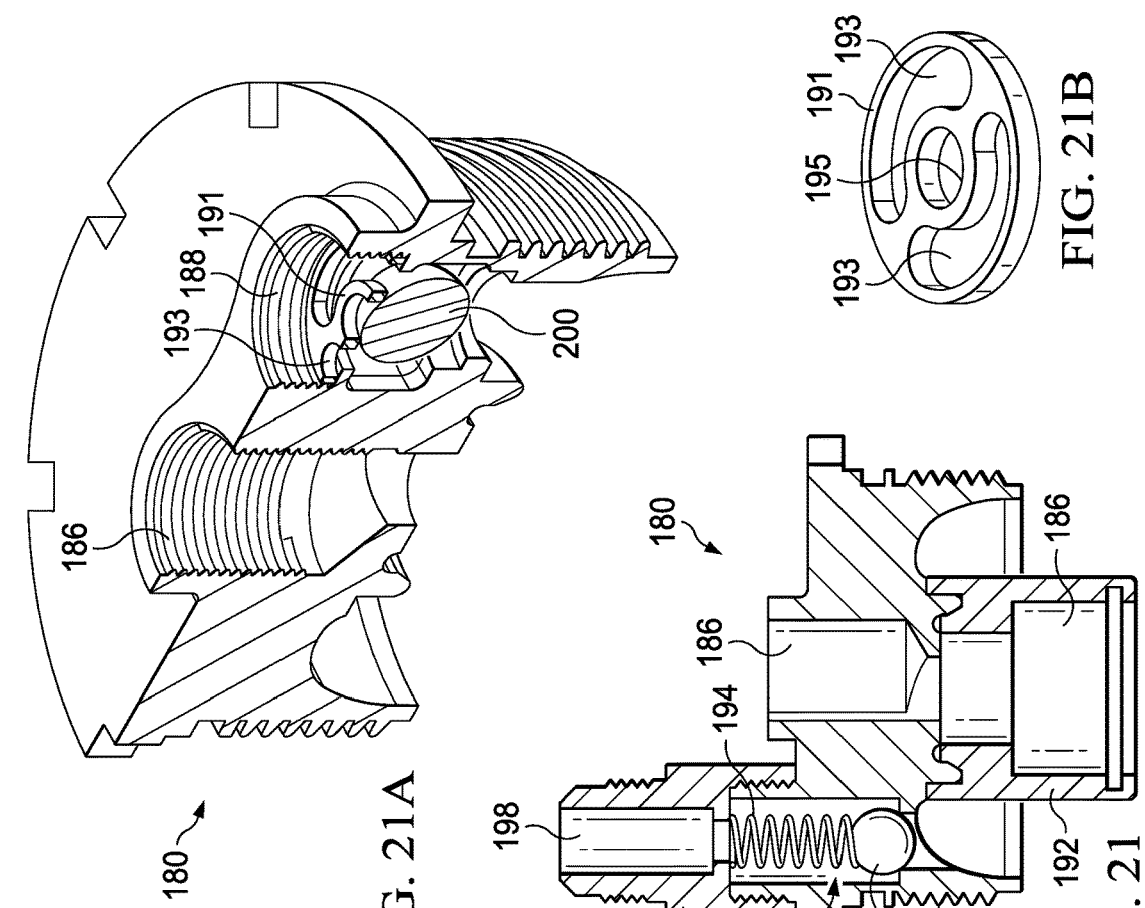

LUBRICATION CONTROL IN INTERNAL COMBUSTION ENGINES

CROSS REFERENCE TO RELATED APPLICATIONS

This application claims the benefit of Provisional U.S. Patent Application No. 62/266,551 filed Dec. 11, 2015, and is a continuation of U.S. patent application Ser. No. 16/375,159, filed Dec. 11, 2016, now U.S. Pat. No. 10,443,457, both of which are incorporated by reference herein in their entireties.

BACKGROUND INFORMATION

1. Field

The present disclosure generally relates to lubrication systems for internal combustion engines, and deals more particularly with controlling the flow of lubricating fluids in such engines.

2. Background

Internal combustion engines have various components such as pistons, shafts and related bearings that require lubrication in order to reduce friction and related wear. Lubrication of these components is typically achieved using a pressurized oil lubrication system having an oil pump that draws oil from an oil sump and pumps it through a series of internal engine passageways and lines to the components requiring lubrication. Adequate lubrication of engine components is more challenging in high-performance applications such as racing engines where rapid changes in engine RPMs and inertial side loads caused by extreme cornering and/or braking may adversely affect oil delivery at the desired pressures.

One example of an engine component requiring lubrication is a bearing supporting an end of a rotating layshaft that is used to transmit motion to camshafts. In some applications, original equipment bearings for this application that are sealed (permanently lubricated) may be retrofitted with a direct oil feed in order to provide the bearing with sufficient lubrication. However, because oil must be diverted to the bearing, this aftermarket solution may result in undesirable reduction of oil pressure at certain locations within the engine, particularly on initial engine start-up. Moreover, the flow of oil provided by the direct oil feed may be insufficient to flush and cleanse the bearing of contaminants.

Inadequate engine lubrication due to oil deprivation and/or inadequate oil pressure may occur for other reasons such as where inertial forces shift oil held within an oil sump or an oil galley. When this local shifting of the oil occurs, it may be temporarily impossible to draw oil from the sump, despite attempts by pressure regulators to compensate for the accompanying drop in oil pressure. Ordinary pressure regulators intended to compensate for these conditions are not entirely adequate and/or are too slow to compensate for transient drops in oil pressure. Under the circumstances just described, oil may temporarily flow backward in oil distribution channels to the oil sump.

SUMMARY

The disclosure relates in general to engine lubrication systems, and more specifically to controls for preventing inadequate oil lubrication of engine components, particularly in high-performance engine applications.

According to one aspect, a system is provided for lubricating a bearing supporting a rotating layshaft in an internal combustion engine. The system includes a flange, an oil delivery line, and a flow control valve. The flange is configured to be attached to the engine and mounts the bearing on the engine. The flange includes an oil inlet port and an oil outlet port configured to direct oil into the bearing. The oil delivery line is configured to be coupled between a source of oil in the engine, and the oil inlet port on the flange. The flow control valve is operable for controlling the flow of oil from the oil outlet port to the bearing. The flow control valve includes an oil pressure responsive valve assembly having a closed state preventing the flow of oil through the control valve and an open state allowing the flow of oil through the flow control valve.

According to another aspect, a system is provided for supporting a rotating layshaft in internal combustion engine. A ball bearing is mounted on an end of the layshaft. The ball bearing has a closed first side and an open second side, and also includes inner and outer races defining a volume of space therebetween. The ball bearing further includes bearing balls disposed within the volume of space and captured between the inner and outer races. The system includes a flange configured to be attached to the engine for mounting the ball bearing on the engine, wherein the open second side of the ball bearing is seated against and faces the flange. The flange includes an oil inlet port, and an oil outlet port facing the open second side of the ball bearing. The oil outlet port is configured to inject pressurized oil directly into the open side of the ball bearing and onto the bearing balls. The oil outlet port is oriented and sized to cause the injected pressurized oil to move through the volume of space. The system further includes an oil delivery line configured to be coupled between a source of pressurized oil on the engine and the oil inlet port on the flange.

According to another aspect, a system is provided for lubricating a ball bearing supporting a rotating layshaft in an internal combustion engine. The system comprises a flange configured to be attached to the engine for mounting the ball bearing on the engine. The flange includes an oil inlet port configured to be coupled with a source of pressurized oil, an oil outlet port, and an internal oil passageway connecting the oil inlet port with the oil outlet port. The oil outlet port is generally aligned with and faces the ball bearing for injecting oil into an interior of the ball bearing and thereby lubricate balls within the ball bearing. An oil delivery line is configured to be coupled between a source of oil on the engine and the oil inlet port on the flange.

According to another aspect, a method is provided of lubricating a ball bearing in an internal combustion engine. The method comprises tapping a source of pressurized oil in the engine and installing a pressure responsive flow control valve between the source of pressurized oil and a flange holding the ball bearing. The method also includes injecting oil into an open side in the ball bearing through an outlet port in the flange. The method also includes using the pressure responsive flow control valve to control injection of the oil through the outlet port into the open side of the ball bearing the flange when the oil pressure reaches a preselected oil pressure value. The method also includes terminating the injection of oil into the bearing when the oil pressure drops to below the preselected oil pressure value.

According to a further aspect, a method is provided of lubricating a ball bearing in an internal combustion engine, wherein the ball bearing has a closed first side and an open second side defining a volume of space therebetween. The method comprises tapping a source of pressurized oil in the engine, and installing a flange on the engine configured to mount the ball bearing thereon, wherein the flange has an oil inlet port and an oil outlet port facing the open second side of the ball bearing. The method further includes mounting the ball bearing on the flange, including orienting the oil outlet port to face the open second side of the ball bearing, and directing oil from the source of pressurized oil to the oil inlet port. Pressurized oil is injected into the volume of space within the ball bearing by directing the pressurized oil through the oil outlet port directly into the open second side of the ball bearing.

One of the advantages of the disclosed embodiments is that oil flow to engine components is controlled in a manner to prevent oil deprivation and related reductions in lubrication during certain engine operating conditions. Another advantage is that the lubrication controls may be easily and quickly retrofitted to existing engines. Still another advantage is that engine bearings can be flushed of contaminants as they are being lubricated with oil.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 21 is an illustration of a cross-sectional view of the backflow preventer.

FIG. 21A is an illustration of a perspective view, cut away in section, of an alternate embodiment of the oil backflow preventer.

FIG. 21B is an illustration of a perspective view of a perforated disc forming part of a valve assembly in the backflow preventer shown in FIG. 21A.

FIG. 22 is an illustration similar to FIG. 21, but exploded to show the component parts of the backflow preventer.

DETAILED DESCRIPTION

Figure 1:
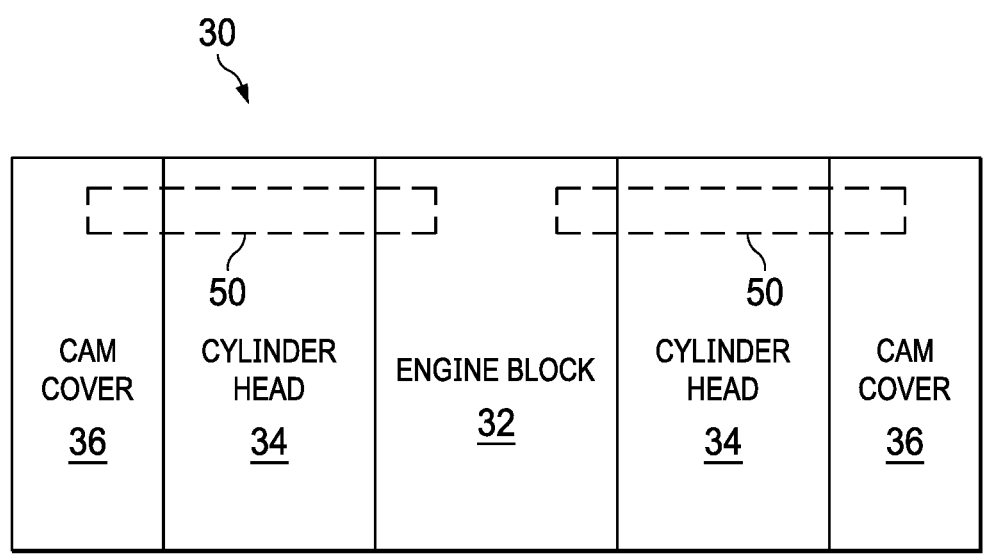
FIG. 1 is an illustration of an overall block diagram of an internal combustion engine.
Figure 2:
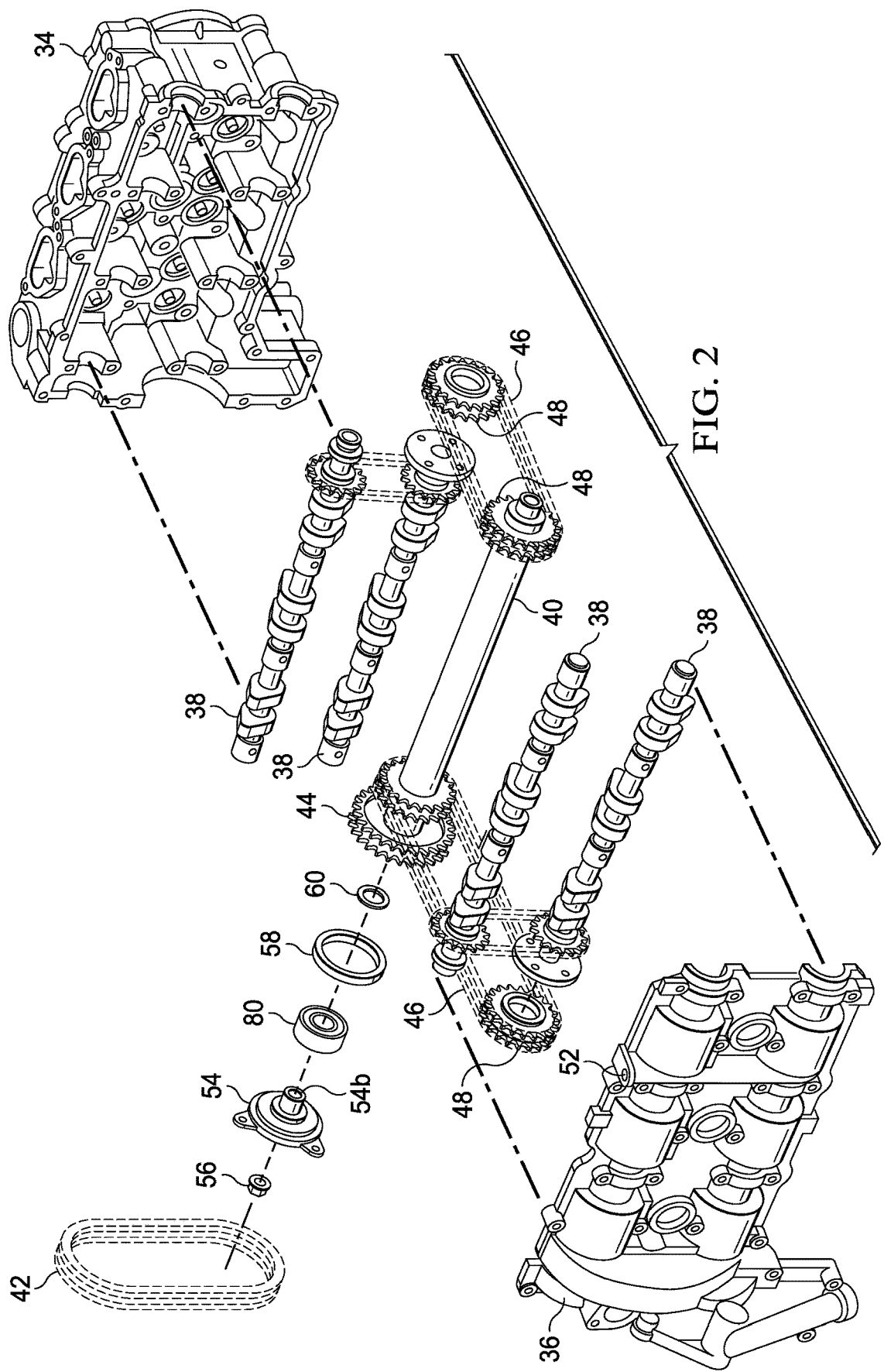
FIG. 2 is an illustration of a perspective, exploded view of certain components of the engine shown in FIG. 1.

Referring first to FIGS. 1 and 2, the disclosed embodiments relate to lubrication control in an internal combustion engine 30, which in the illustrated example, comprises an engine block 32 having horizontally opposed cylinder heads 34 provided with valve or cam covers 36. However, the disclosed lubrication control is suitable for use with a wide variety of internal combustion configurations. Moving components of the engine 30 are lubricated by oil drawn from a later discussed oil sump and pumped into various oil galleys 50 and oil channels (not shown) in the engine 30. Referring particularly to FIG. 2, a layshaft, sometimes referred to as an intermediate shaft 40, transmits power from a crankshaft (not shown) of the engine 30 to intake and exhaust cams 38 which control opening and closing of intake and exhaust valves (not shown) in the cylinder heads 34. Power from the crankshaft is transmitted via a chain 42 to a sprocket 44 on one end of the layshaft 40. Power is transmitted from the layshaft 40 via a series of sprockets 48 and chains 46 to the cams 38.

Figure 5:
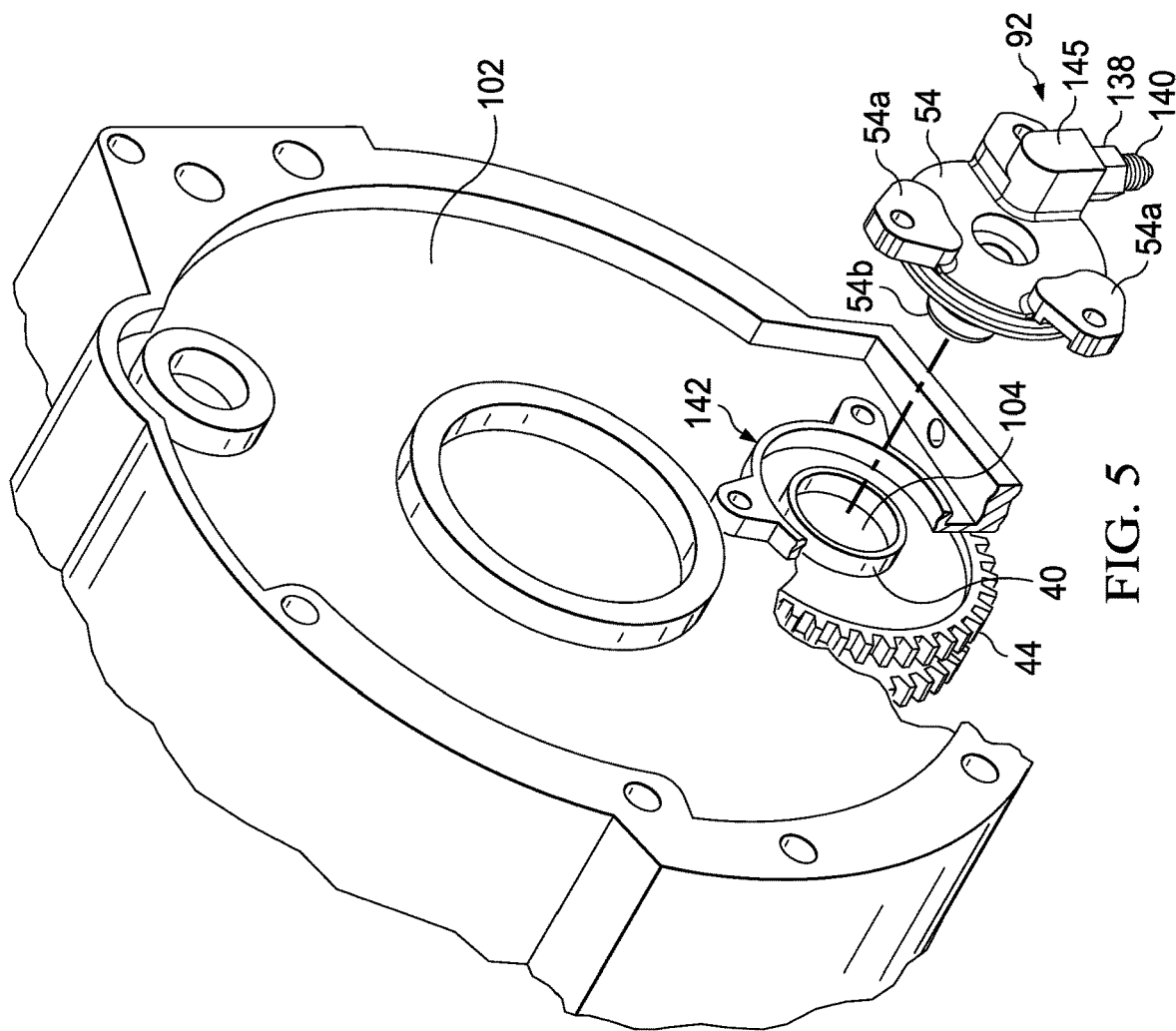
FIG. 5 is an illustration of a perspective, exploded view of the rear of the engine shown in FIGS. 1 and 2, portions of the engine case being broken away to reveal a layshaft and associated sprocket.

One and of the layshaft 40 is mounted for rotation on a bearing 80 located inside an open end 104 (FIG. 5) in the layshaft 40. An opening 142 in the engine case cover 102 provides access to the open end 104 of the layshaft 40. In one embodiment, the bearing 80 is sleeved over a post 54b on a flange 54 which effectively mounts one end of the layshaft 40 on the engine case cover 102. As best seen in FIG. 5, flange 54 includes ears 54a that are attached to the rear engine case cover 102 by suitable fasteners (not shown). Depending on the particular engine configuration, a seal 58, O-ring 60, snap ring (not shown), retention bolt 118 (see FIG. 9) and a nut 56 are used retain and seal the flange 54 and bearing 80 assembly at the end of the layshaft 40.

Figure 3:
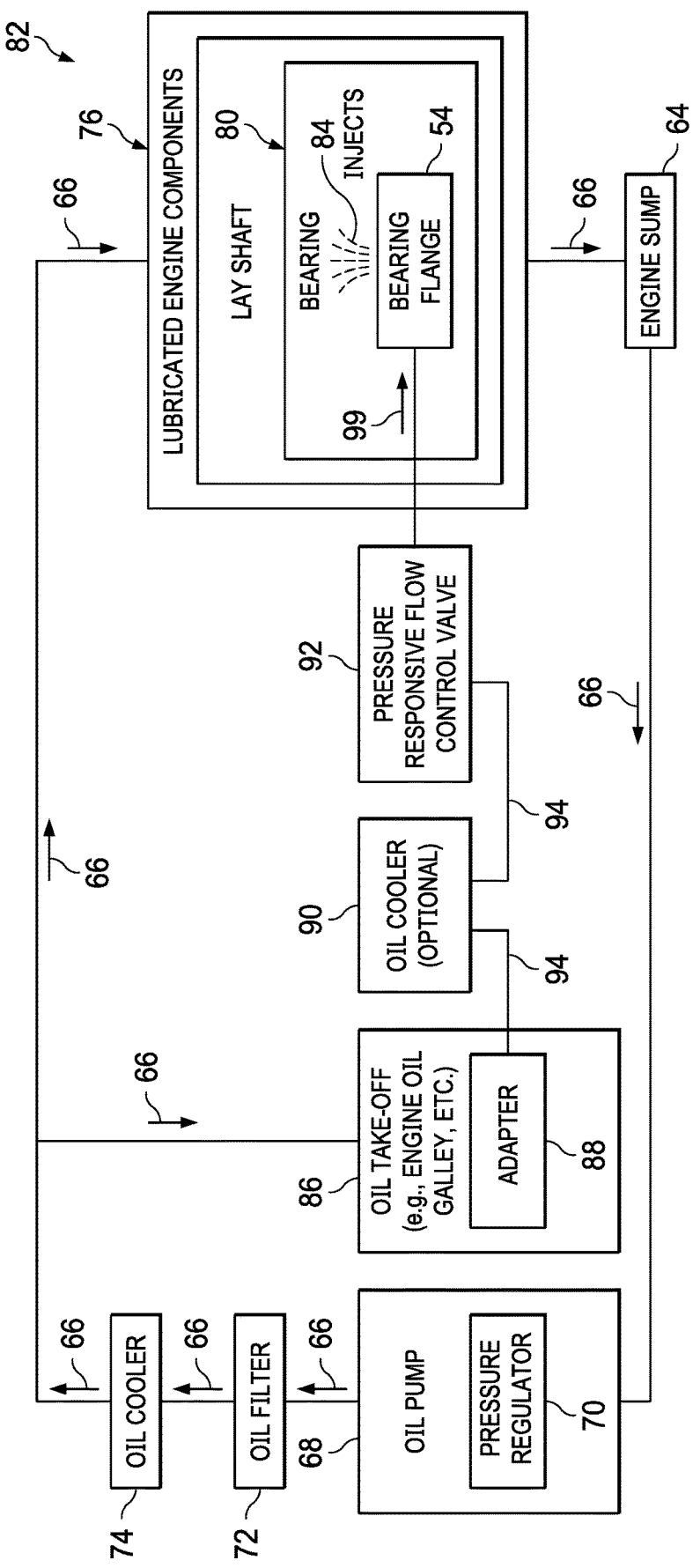
FIG. 3 is an illustration of a functional block diagram of a lubrication system for the engine of FIG. 1.

Attention is now directed to FIG. 3 which broadly illustrates a pressurized lubrication system 82 for lubricating various engine components 76, including but not limited to the bearing 80 on the end of the layshaft 40. Oil in an engine sump 64 is pumped through the lubrication system 82 by an oil pump 68 that includes a pressure regulator 70 which adjusts the oil pressure according to engine operating conditions and demand. Oil flows 66 from the engine sump 64 through the oil pump 68 through an oil filter 72 and oil cooler 74 to the lubricated engine components 76. The oil filter 72 may be integrated into the crankcase 178 (see FIG. 17) of the engine 30, or may be a separate, in-line type oil filter 72. Oil derived from an oil take-off 86 is delivered via an oil delivery line 94 through an optional oil cooler 90 and a pressure responsive flow control valve 92 (hereinafter "flow control valve") before flowing 99 into the previously discussed flange 54.

As will be discussed below in more detail, oil flowing 99 through the flange 54 is injected 84 into the bearing 80 at a pressure that both lubricates the bearing 80 and flushes it of contaminants. The oil take-off 86 may comprise, for example and without limitation, an oil galley (FIG. 1) or similar source of oil that has been filtered and cooled by the oil filter 72 and oil cooler 74, before being circulated through the engine 30. Depending upon the location of the oil take-off 86, an adapter 88 may be used to connect the oil delivery line 94 to the location where the oil is sourced, such as a port 52 on the cam cover 36. As will be discussed later, the flow control valve 92 is normally closed and prevents flow 99 of oil to the flange 54 until oil pressure in the oil delivery line (which corresponds to the engine oil pressure) increases to a predetermined pressure level. When the pressure of the oil in the oil delivery line 94 reaches this predetermined pressure level, the flow control valve 92 opens, allowing oil to be injected into the bearing 80. Sudden opening of the control valve 92 effectively produces a spurt of oil into the bearing 80 which cleanses it of contaminant particles, following which a steady flow 99 continuously lubricates the bearing 80.

By delaying opening of the flow control valve 92 until engine oil pressure reaches a predetermined value, a possible drop in engine oil pressure is prevented due to diversion of oil through the flange 54 into the bearing 80. Normally, the flow control valve 92 opens shortly after engine start up when the engine oil pressure has reached a normal level. However there may be other engine operating conditions where engine oil pressure drops to an undesirably low level, in which case the flow control valve closes to prevent a further reduction in engine oil pressure due to diversion of oil through the flange 54.

Figure 4:
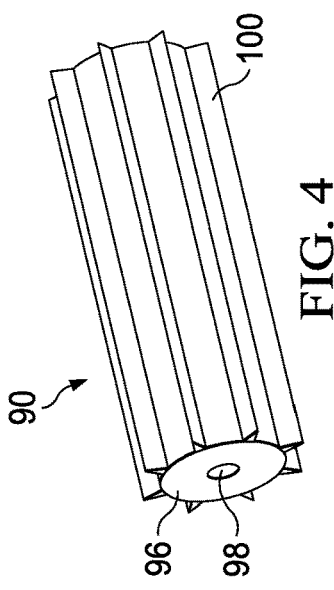
FIG. 4 is an illustration of a perspective view of an optional in-line oil cooler for use in the lubrication system shown in FIG. 3.

Referring now to FIG. 4, in one exemplary embodiment, the oil cooler 90 referred to above may comprise an in-line type oil cooler having a body 96 made of thermally conductive material which acts as a heat sink to remove thermal energy from oil flowing through a through hole 98 in the body 96. Optionally, the body 96 may include circumferentially spaced, external cooling fins 100 which function to transfer thermal energy from the body 96 to the surrounding environment.

Figure 6:
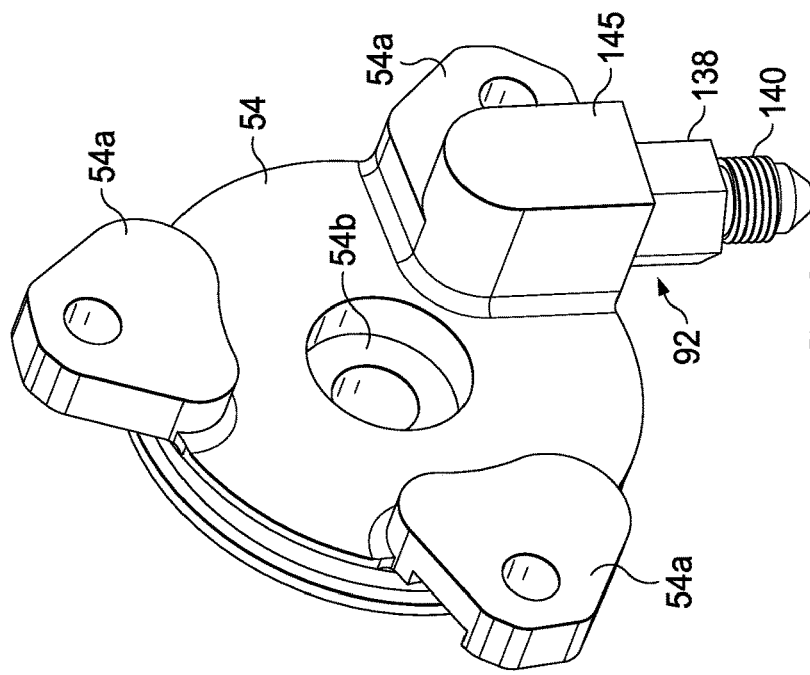
FIG. 6 is an illustration of a perspective view of the flange shown in FIG. 5.

FIGS. 5 and 6 illustrate additional details of the flange 54. Flange 54 includes three circumferentially spaced apart ears 54a adapted to receive fasteners (not shown) that mount the flange 54 on an engine case cover 102 at the rear of the engine 30. The flange 54 further includes a forwardly extending post 54b (see FIG. 2 also) over which the bearing 80 (not shown in FIG. 5) is sleeved. The flange 54 further includes an integrated valve body 145 which forms a portion of the flow control valve 92 previously mentioned. As will be discussed below, the valve body 145 includes a threaded inlet port (not shown in FIG. 6) that receives an adapter fitting 138 provided with a threaded nipple 140 for coupling with one end of the oil delivery line 94.

Figure 7:
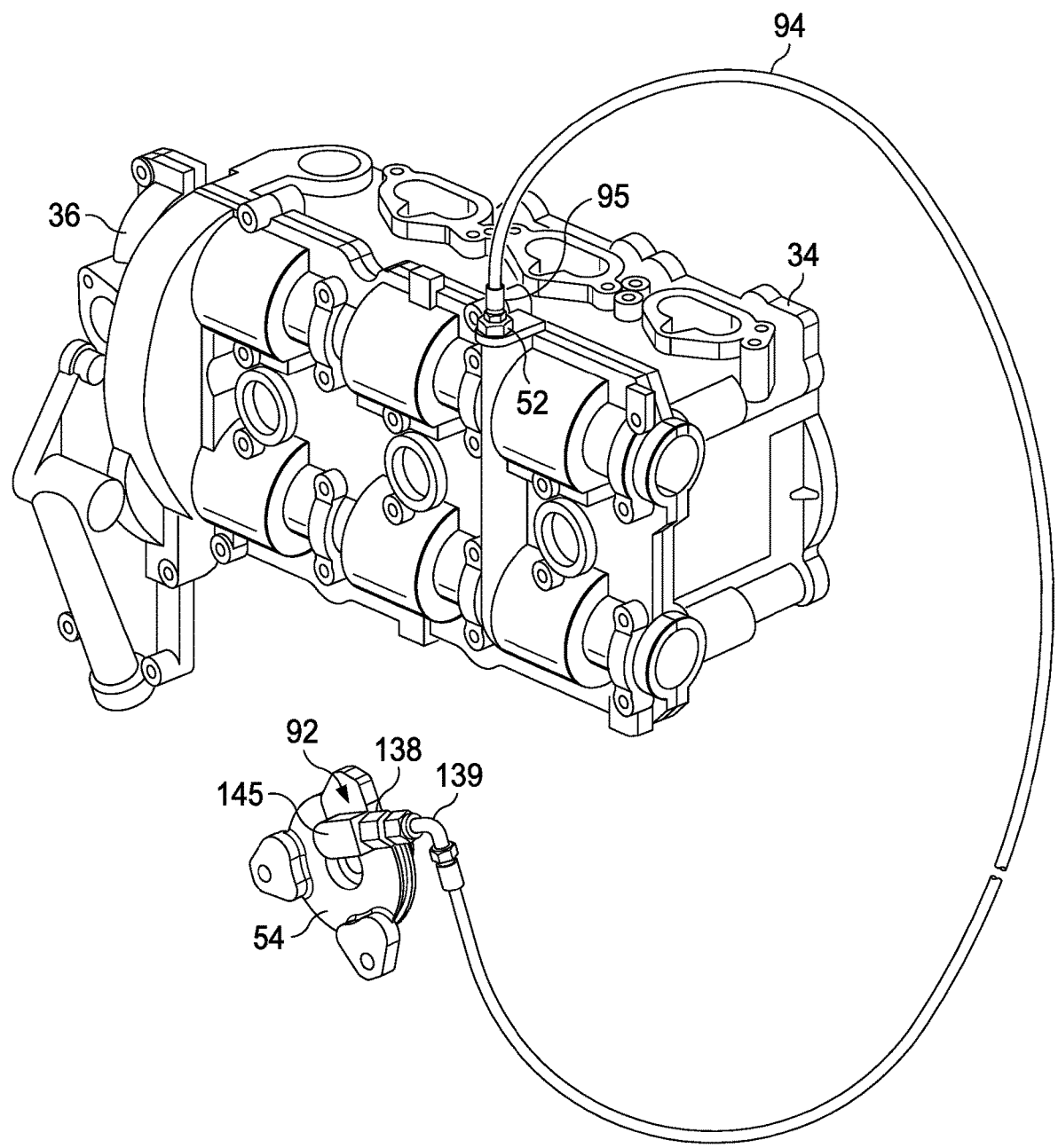
FIG. 7 is an illustration of a perspective of a direct oil feed system, coupled with an oil galley within a camshaft cover and cylinder head of the engine of FIG. 1.

Attention is now directed to FIG. 7 which illustrates connection of the flange 54 to an oil galley 50 (FIG. 1) within the cam cover 36 and head 34. In this example, the flow control valve 92 is integrated into the flange 54 however, in other embodiments, the flow control valve 92 may be coupled in-line with the oil delivery line at any point along its length, or alternatively, the flow control valve 92 may form part of or integrated into a take-off fitting 95 that couples the oil delivery line 94 with port 52 on the cam cover 36 and head 34. In this example, the oil delivery line 94 is coupled with the flange 54 by an adapter fitting 138 and an elbow 139. The oil delivery line 94 may comprise any suitable flexible conduit capable of withstanding the typical levels of oil pressure in engine applications, including higher pressures used in high-performance engines.

Figure 9:
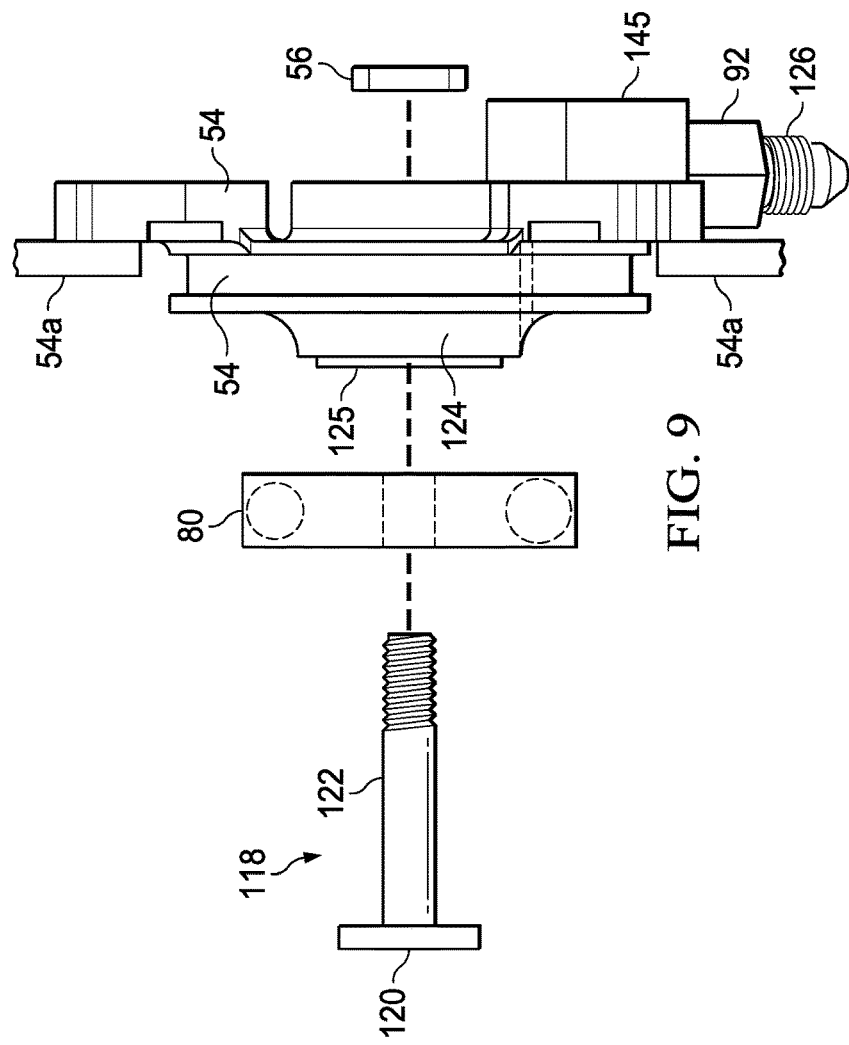
FIG. 9 is an illustration similar to FIG. 8 but exploded.
Figure 8:
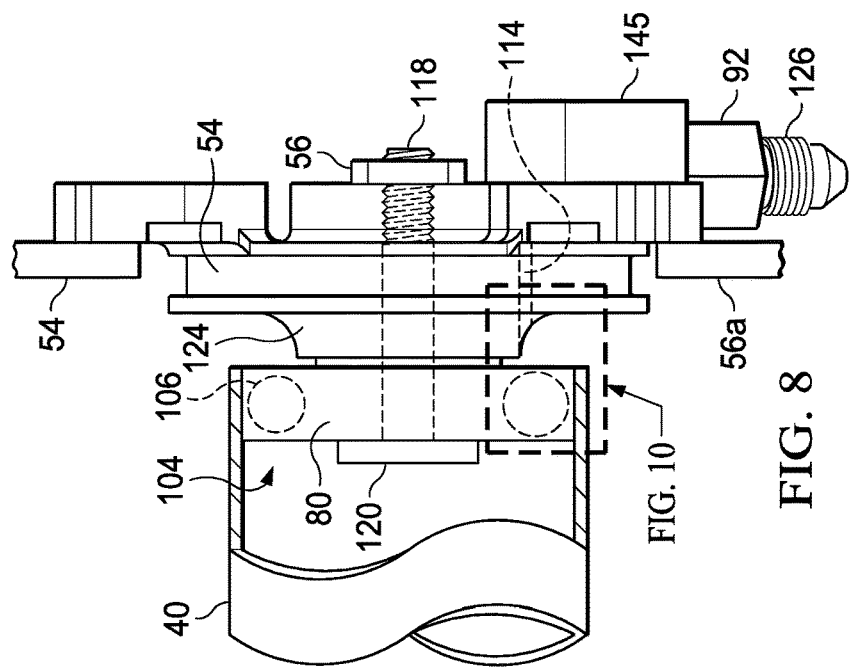
FIG. 8 is an illustration of a side view of one end of the layshaft, parts of the layshaft broken away to reveal a bearing mounting the layshaft for rotation on a flange.

FIGS. 8 and 9 illustrate additional details of the assembly that mounts and supports the end of the layshaft 40. In these Figures, an alternative embodiment of the flange 54 includes a chamfered land 124 having a central locator ring 25 which fits inside of the inner race 108 (FIG. 10) of the bearing 80. One side of the bearing 86 fits against the face of the land 124. The bearing 80 is held against the flange 54 by a retention bolt 118 that has having a shank 122 and a flat head 120. The outer end of the shank 122 is threaded to receive a nut 56. Tightening the nut 56 draws the head 120 of the retention bolt 118 against the bearing 80, which in turn draws the bearing 80 against the flange 54. The outer race 110 (FIG. 10) of the bearing 80 is received within the open end 104 of the layshaft 40, and may be retained therein by a snap ring (not shown) received within a groove (not shown) on the inside wall of the layshaft 40.

Figure 10:
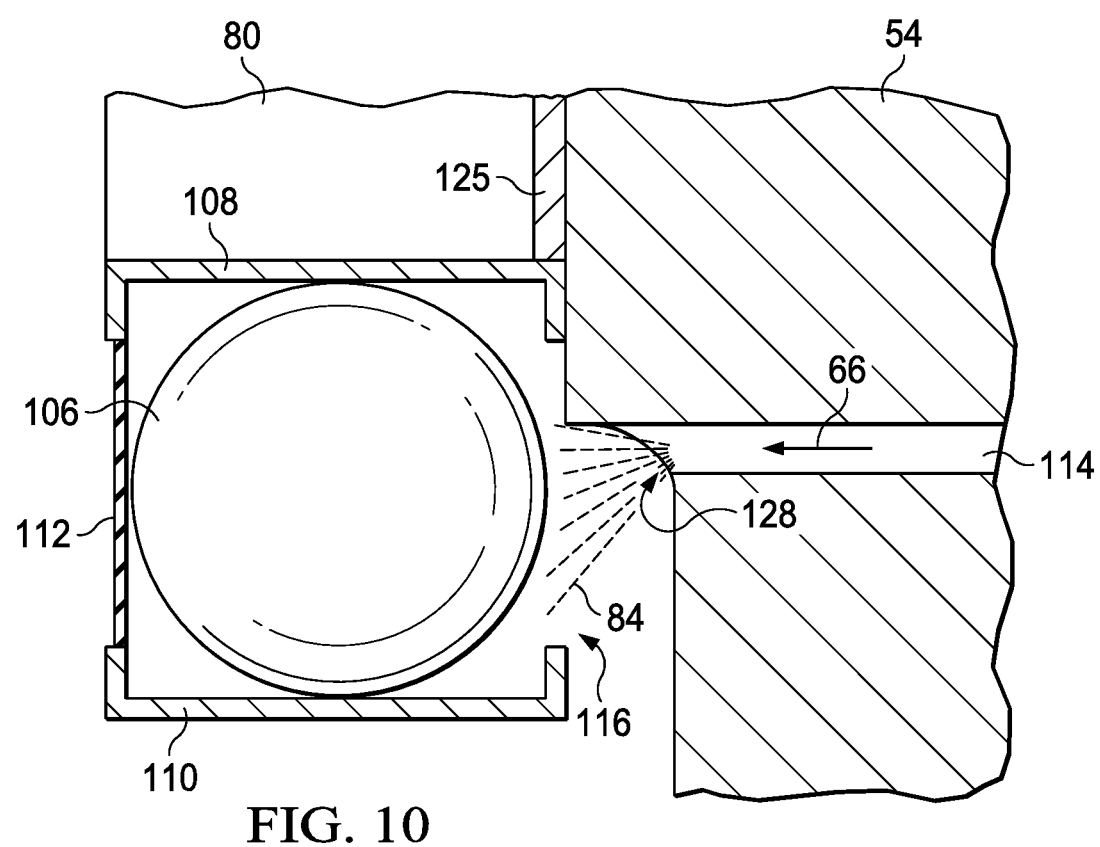
FIG. 10 is an illustration of the area designated as "FIG. 10" in FIG. 8, parts being broken away in section for clarity.
Figure 11:
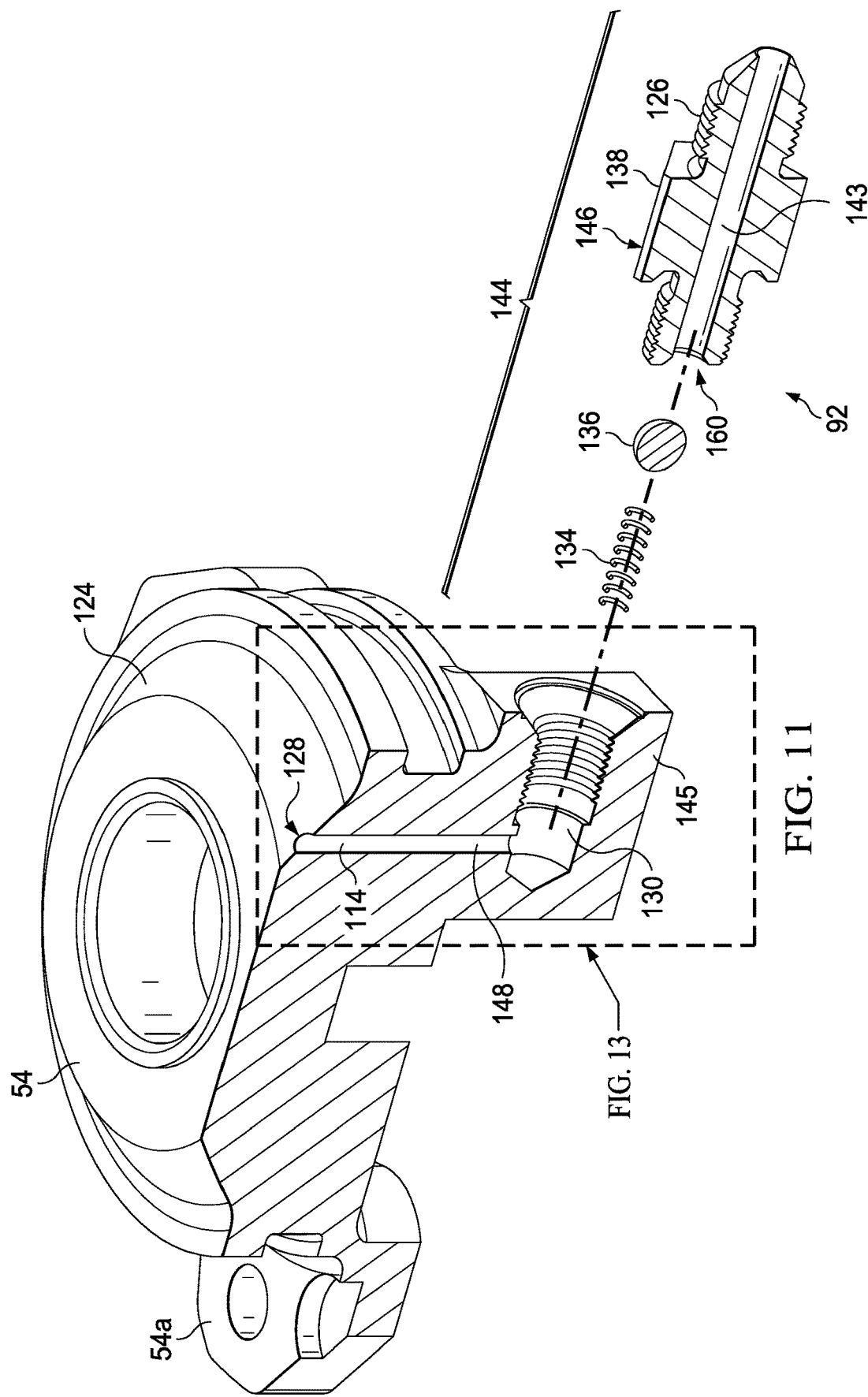
FIG. 11 is an illustration of exploded, perspective view of the flange and one form of a pressure responsive flow control valve, parts being cut away in section.
Figure 13:
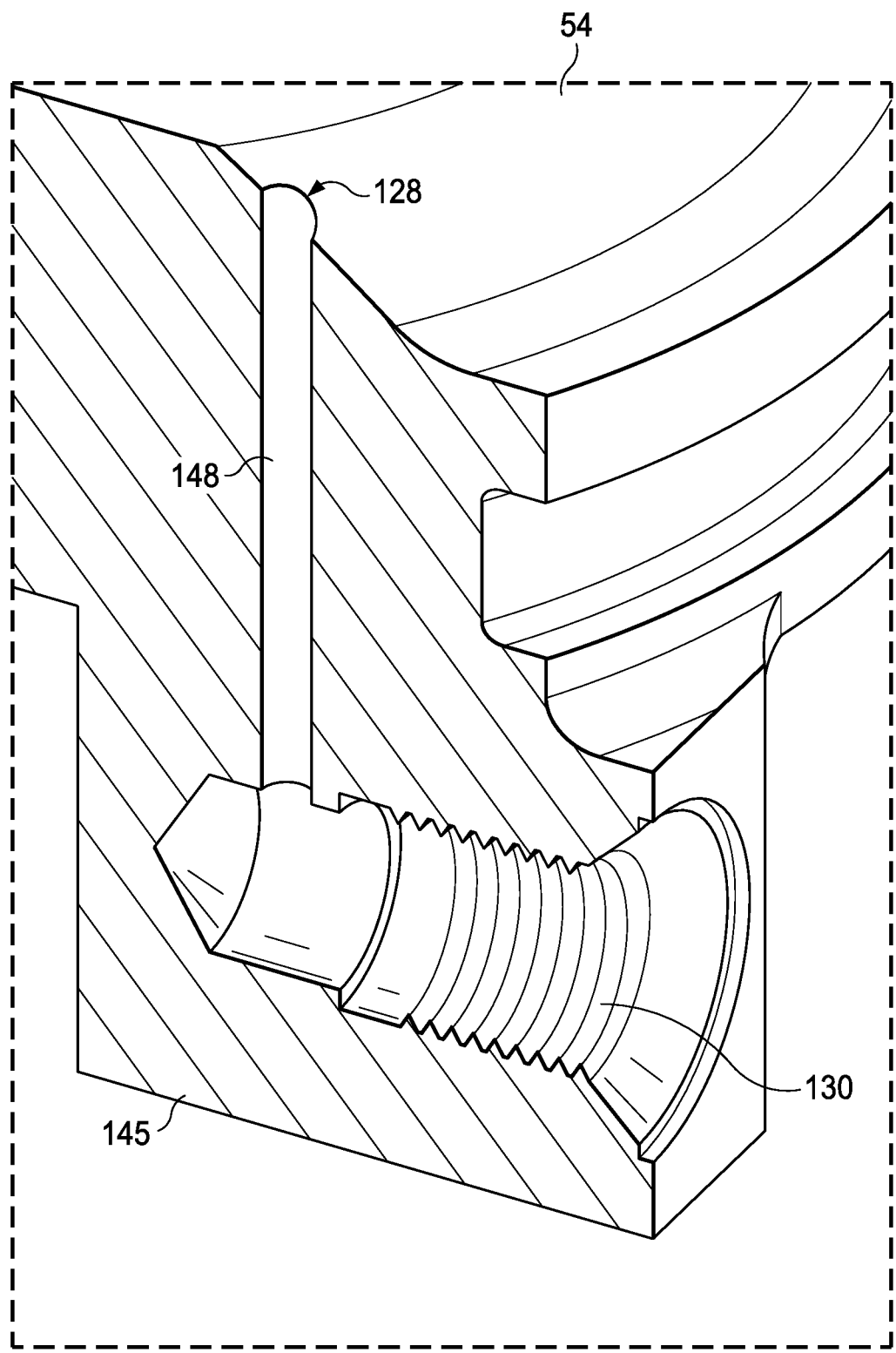
FIG. 13 is an illustration of the area designated as "FIG. 13" in FIG. 11.

Reference is now made it to FIGS. 10, 11 and 13 which illustrate additional details of the flange 54 and flow control valve 92. In this embodiment, wherein the flow control valve 92 is integrated into the flange 54, the flange 54 has a threaded inlet port 130 in a valve body 145 that is integral with the flange 54. The interior of the inlet port 130 communicates with a channel 148 forming an oil passageway 114 that extends longitudinally, substantially perpendicular to both the longitudinal axis of the inlet port 130 and the plane (side) of the bearing 80. The oil passageway 114 terminates in an outlet port 128 in the land 124. As best seen in FIG. 10, the outlet port 128 is aligned with an open side 116 of the bearing 80 between the inner and outer races 108, 110 respectively. The other side of the bearing 80 is closed by a seal 112 to prevent escape of oil into the interior of the layshaft 40.

As best seen in FIG. 10, pressurized oil flows through the oil passageway 114 and is injected 84 directly into the open side 116 of the bearing 80. The injection 84 of the pressurized oil results in the oil covering bearing balls 106 and moving through the volume of space inside the bearing 80 between the inner and outer races 108, 110, thereby both cleansing and flushing this volume of contaminants while lubricating the bearing 80.

Referring particularly to FIG. 11, the flow control valve 92 includes a valve assembly 144 comprising an adapter fitting 138, a compression spring 134 and a ball 136. The inner threaded end of the adapter fitting 138 is threadably received within the threaded inlet port 130, and includes a ball seat 160. The outer end of the adapter fitting 138 includes a threaded nipple 126 that is adapted to be coupled with the oil delivery line 94. The compression spring 134 biases the ball 136 against the ball seat 160, normally maintaining the flow control valve 92 closed to prevent oil flow into the flange 54. However when the oil pressure in the oil delivery line 94 reaches a preselected level, the biasing force of the compression spring 134 is overcome, and the ball 136 moves away from the ball seat 160, opening the flow control valve 92 and allowing oil to flow into the flange 54 and injected into the bearing 80.

Figure 12:
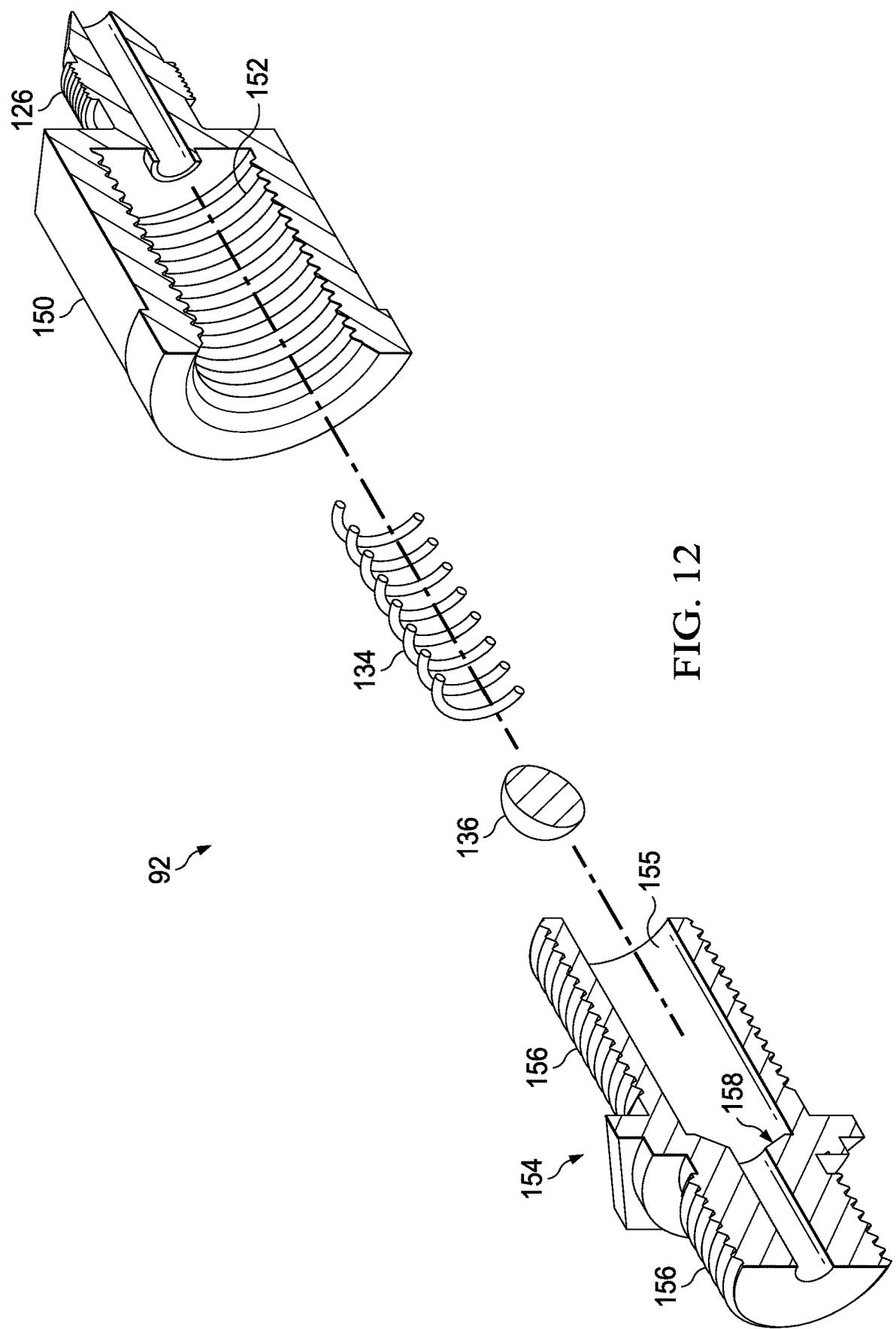
FIG. 12 is an illustration of exploded, perspective view of another form of the pressure responsive flow control valve.

As previously mentioned, the flow control valve 92 may optionally be installed at the point of oil take-off (FIG. 3). FIG. 12 illustrates another embodiment of the flow control valve 92 that is suitable for installation in the port 52 in the cam cover 36/head 34 or a similar port on the engine 30 that provides direct access to engine oil. As previously mentioned, it is desirable that the oil take-off derive oil that has been filtered and cooled, however it may be possible to install the flow control valve 92 at a location that is upstream of the point where the oil is either filtered or cooled. For example, the flow control valve 92 could be installed as a fitting on or near either the oil pump 68 or the oil filter 72.

The flow control valve 92 shown in FIG. 12 broadly comprises an adapter fitting 150, a valve body 154, a compression spring 134 and a valve ball 136. The adapter fitting 150 includes internal female threads 152 that receive male threads 156 on an end of the valve body 154. The outer end of the adapter fitting 150 includes a threaded nipple 126 which is adapted to be coupled with the oil delivery line 94. The valve body 54 also includes a male threaded end 156 that is threadably received within the port 52 on the cam cover 36, thereby mounting the flow control valve 92 directly on the cam cover 36/head 34. The compression spring 134 biases the valve ball 136 against a ball seat 158 on the valve body 154, normally holding the flow control valve 92 in its closed position until oil pressure overcomes the biasing influence of the compression spring 134, forcing the valve ball 136 away from the valve seat 158 and thereby permitting oil flow through the flow control valve 92, similar to the operation of the flow control valve 92 described earlier with reference to FIGS. 10, 11 and 13.

Figure 14:
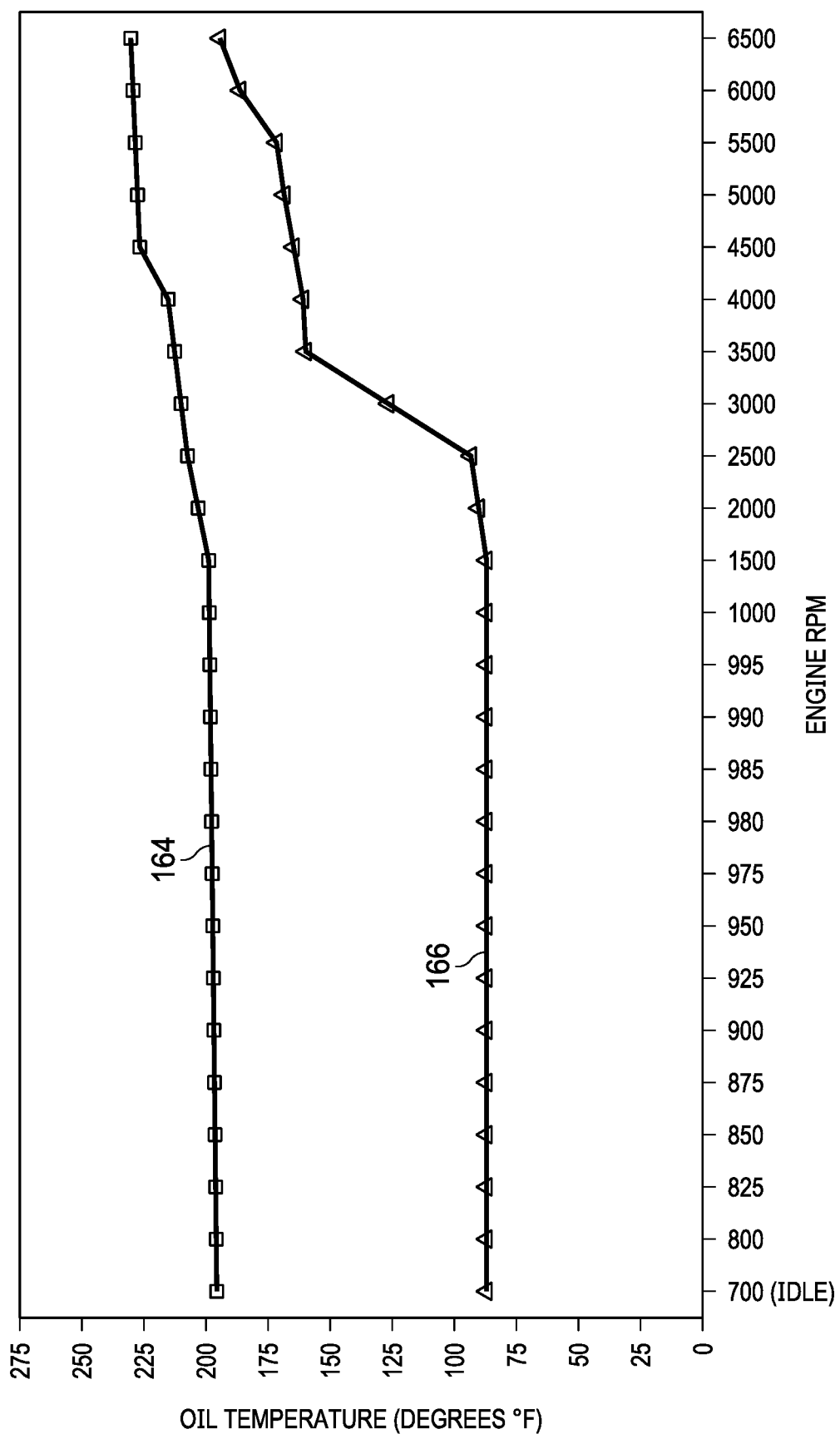
FIG. 14 is an illustration of a graph showing engine oil temperature at the sump, and engine oil temperature at the flange, as a function of engine RPMs.
Figure 15:
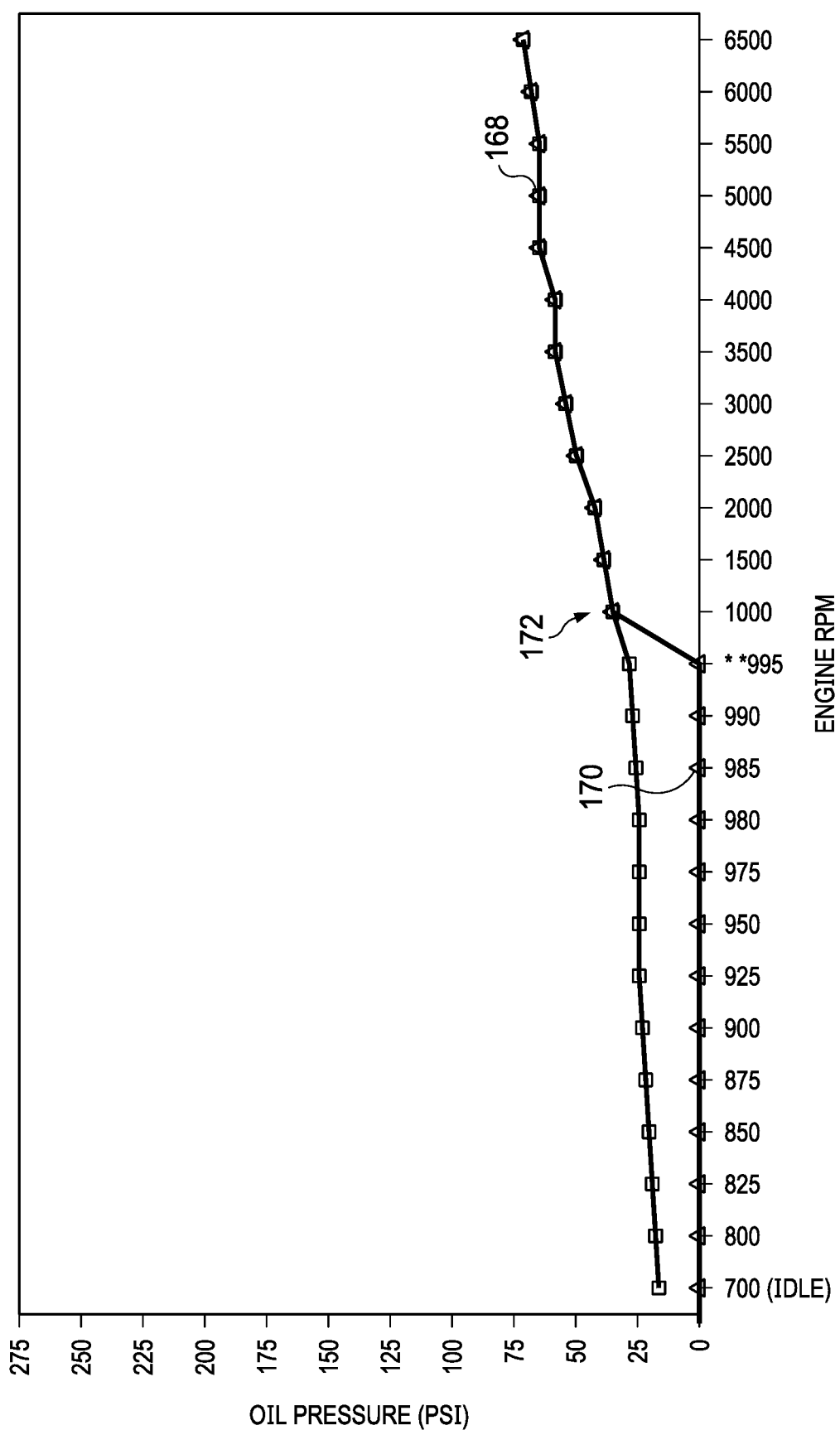
FIG. 15 is an illustration of a graph showing engine oil pressure and oil pressure through the flow control valve, as a function of engine RPMs.
Figure 16:
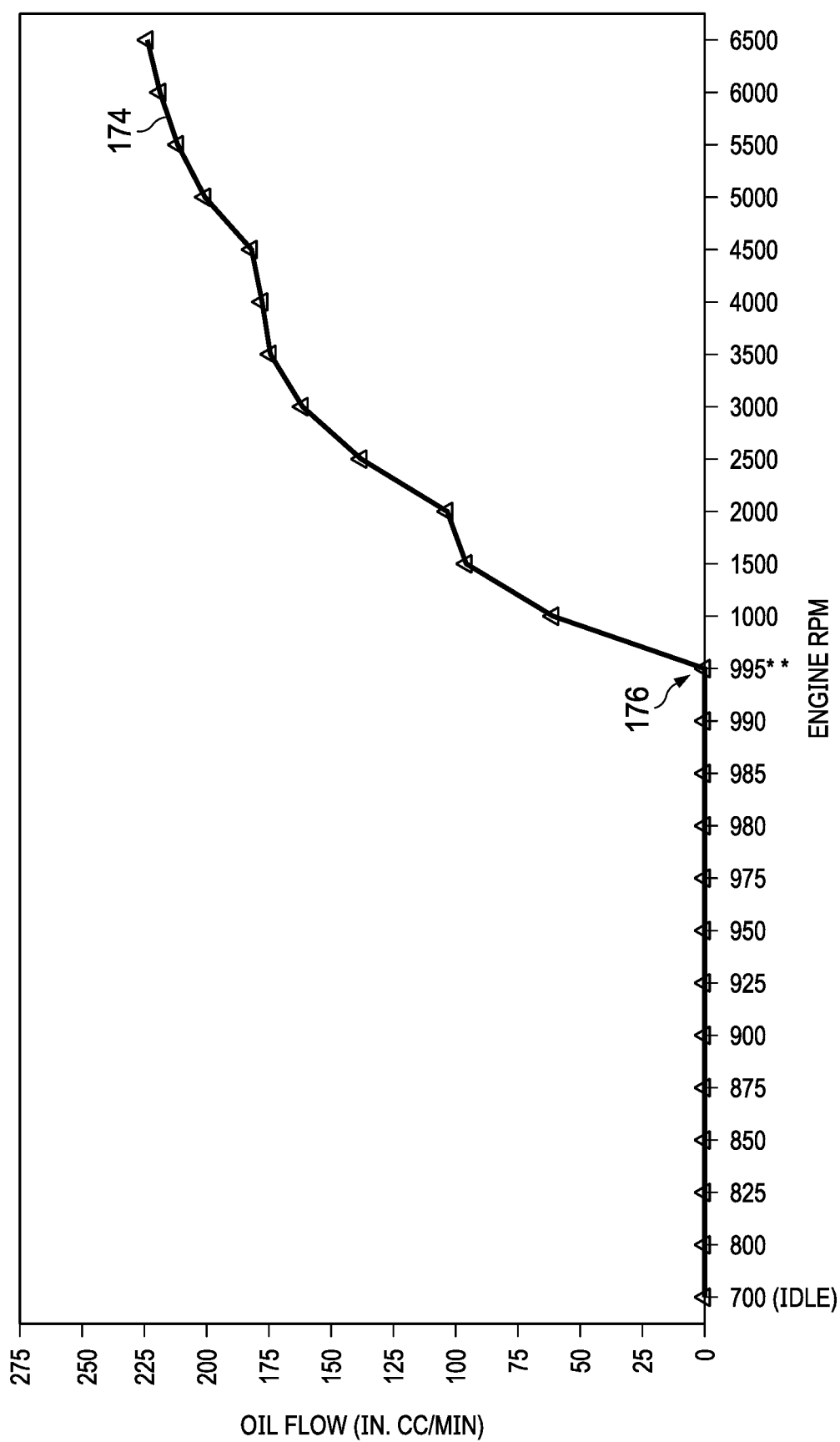
FIG. 16 is an illustration of a graph showing oil flow through the flow control valve, as a function of engine RPMs.

Attention is now directed to FIGS. 14-16 which illustrate various parameters of a typical internal combustion engine with opposing cylinders, which employs the flow control valve 92 configured as described above. The various parameters are shown as a function of engine RPMs. In FIG. 14, plots 164 and 166 respectively show temperature of the oil delivered to the flange 54, and temperature of oil in the oil sump 64 which is the same temperature of the oil pumped through the oil filter 72 (FIG. 3). From these plots, it may be appreciated that the temperature of the oil delivered to the bearing 80 is substantially less than the temperature of the oil in the oil sump 64 as a result of the oil delivery line and before being connected to an oil take-off 86 location (FIG. 3) that receives oil that has been cooled by an oil cooler 74.

FIG. 15 illustrates plots 168, 170 of oil pressure as a function of engine RPM, respectively present at the output of the oil pump 68, and at the outlet port 128 the flange 54. As can be seen from these plots, the oil pressure at the outlet port 128 remains at zero until an increase in engine RPMs causes the engine oil pressure to increase to a point that causes the flow control valve 92 to open. In example shown in FIG. 15, the flow control valve 92 opens (arrow 172) at between approximately 995 and 1000 RPMs. FIG. 16 shows a plot 174 of oil flow through the outlet port 128 in the flange 54 as a function of engine RPM. At approximately 995 RPMs, the flow control valve 92 opens, quickly allowing a spurt, and then continuous flow of oil through the outlet port 128 into the bearing 80.

Figure 17:
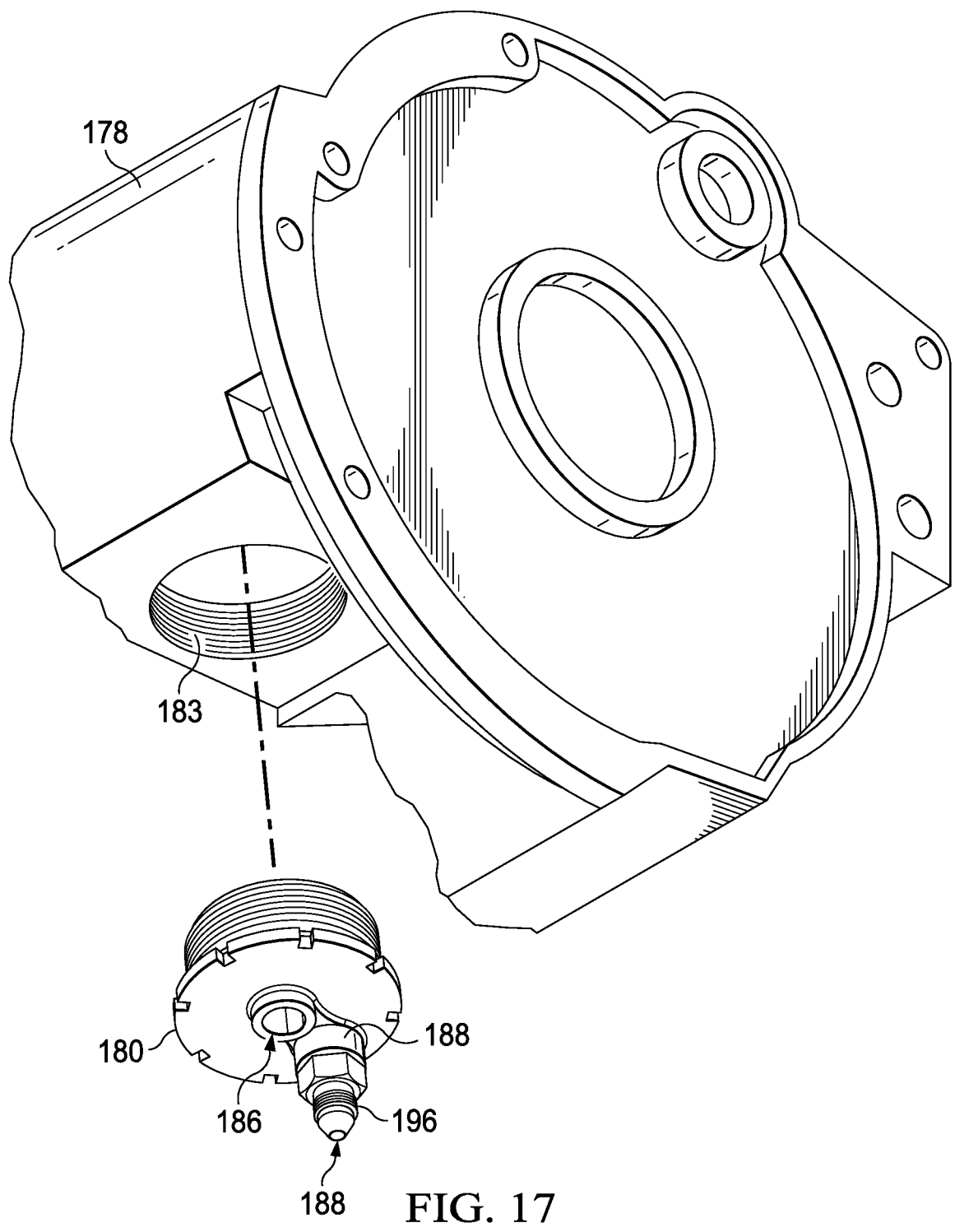
FIG. 17 is an illustration of a perspective view of the rear of the engine in FIG. 1, showing the location of an oil backflow preventer on the crankcase of the engine.
Figure 19:
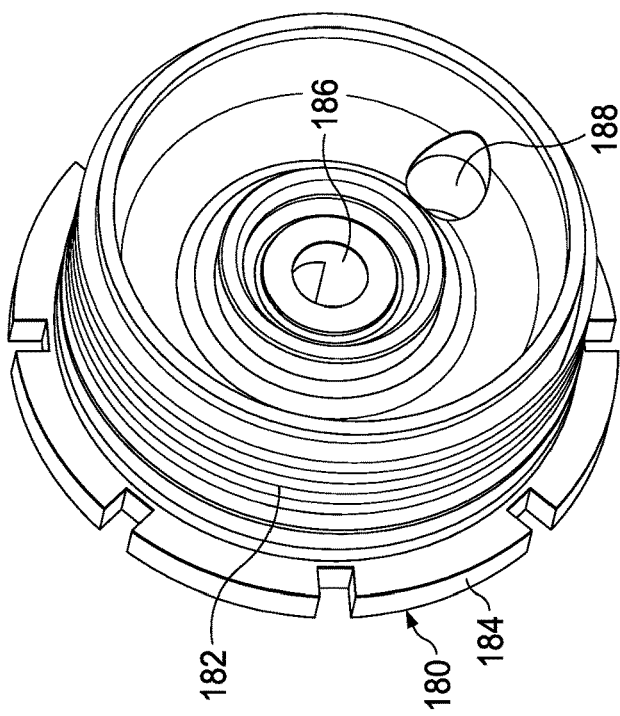
FIG. 19 is an illustration of a perspective view of the top of the backflow preventer.
Figure 20:
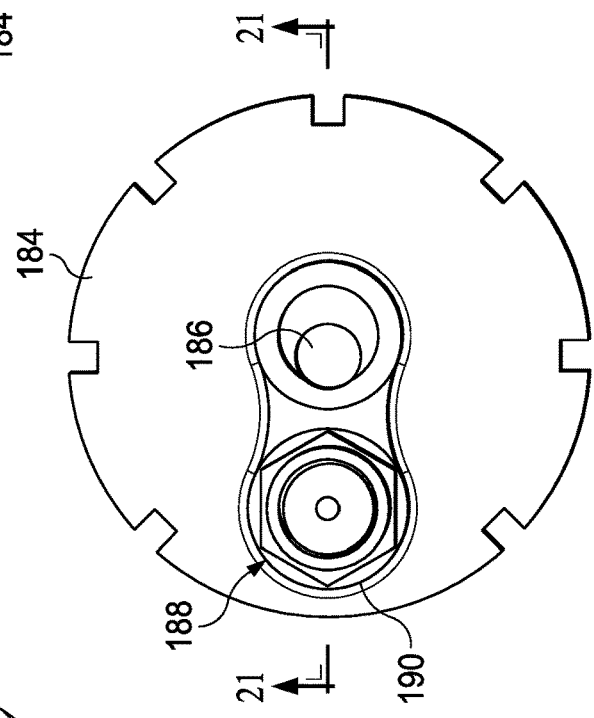
FIG. 20 is an illustration of the bottom of the backflow preventer.
Figure 18:
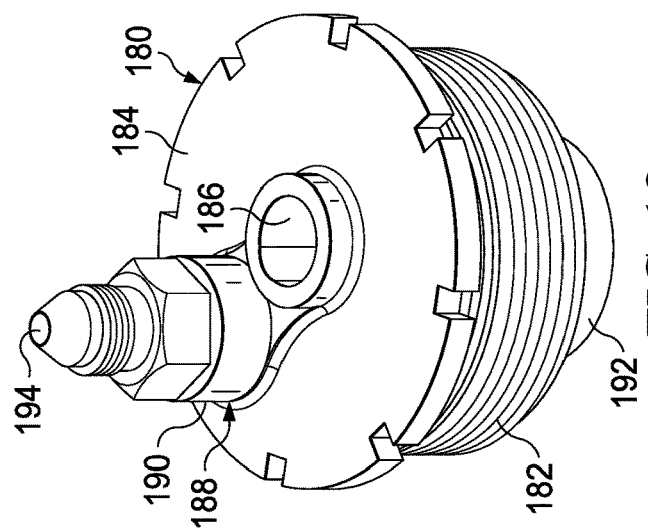
FIG. 18 is an illustration of a bottom, isometric view of the backflow preventer.
Figure 23:
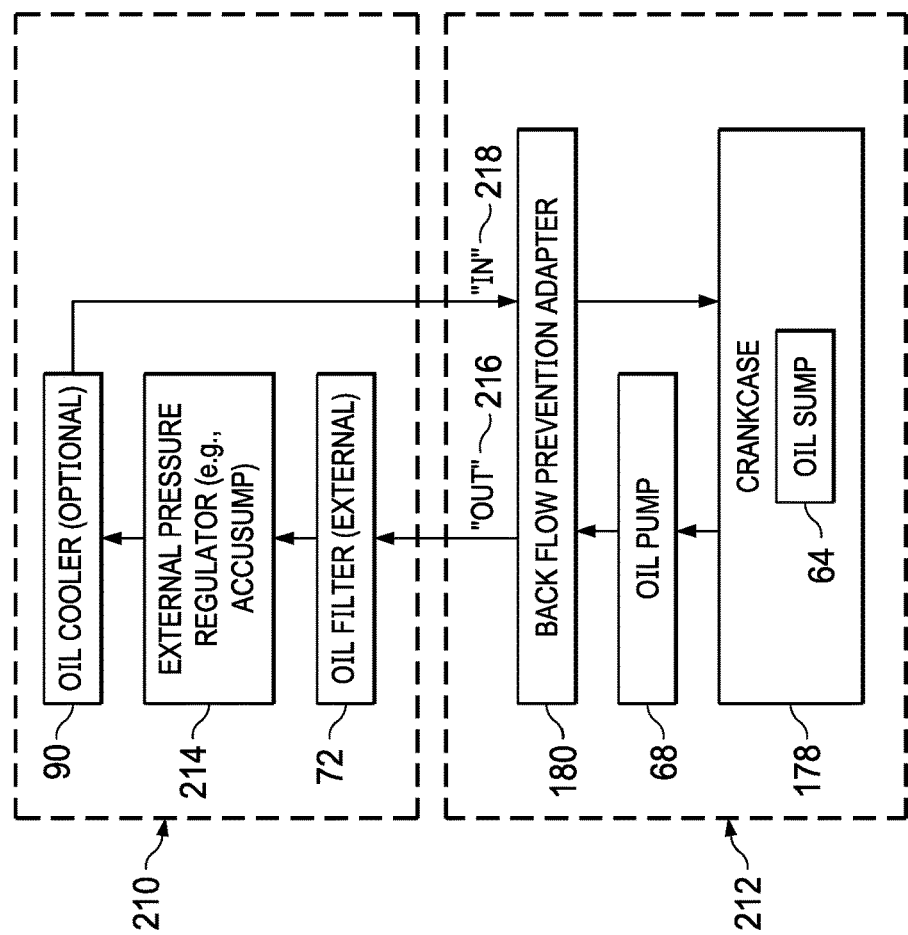
FIG. 23 is an illustration of a functional block diagram of an oil lubrication system employing the backflow preventer shown in FIGS. 17-22.

Referring now to FIGS. 17 and 23, another oil flow control device comprising a backflow prevention adapter 180, hereinafter "adapter" 180, functions to prevent reverse flow of a lubricating fluid such as oil in an internal combustion engine of the type previously described and often used in high-performance engine applications. As shown in FIG. 23, oil in an oil sump 64 within a crankcase 178 is pumped by an oil pump 68 through an outlet port 188 in the adapter 180. The adapter 180 along with the oil pump 68, crankcase 178 and oil sump 64 form part of an engine 212. Oil from the outlet port 188 of the adapter 180 is delivered to one or more external engine components 210, such as, for example and without limitation, an external oil filter 72, an external pressure regulator 214 and an optional oil cooler 90. After passing through the external components 210, oil is delivered in a loop, back to an inlet port 186 in the adapter 180, following which it is returned to the oil sump 64.

Depending upon the engine and engine application, the oil pressure may temporarily drop to a level that results in inadequate lubrication of certain engine components. For example, in racing cars during heavy breaking, acceleration or banking, the oil pump 68 may not be able to draw oil from the oil sump 64 because of shifting of the oil in the sump 64 during vehicle maneuvers. As a result of this drop in oil pressure, the flow of oil may be temporarily reversed, wherein oil flows back toward the oil pump 68, thereby potentially depriving certain engine components such as a crankshaft, from adequate lubrication. In order to prevent this backflow of oil, the adapter 180 functions as a one way valve, sometimes referred to as a check valve, that allows oil to freely flow through its outlet port 188, to the external components 210 but, in the event of an unintended drop in oil pressure, prevents backflow of the oil toward the oil pump 68.

Attention is now directed to FIGS. 17-22 which illustrate additional details of one embodiment of the backflow prevention adapter 180. The adapter 180 includes an externally threaded body 182 that is adapted to be threadably received within an internally threaded opening 183 in an engine crankcase 178, which normally receives a screw-on type engine oil filter (not shown). The adapter 180 includes a valve assembly 190 threadably received within an outlet port 188 in the adapter 180. A central inlet port 186 is adapted to be received by a fixture (not shown) within the crankcase 178 that normally receives the oil filter.

As previously discussed, oil flows through a passageway 198 in the valve assembly and then through the outlet port 188 to external components 210 (FIG. 23) before being delivered back into the inlet port 186 of the adapter 180. As previously discussed in connection with FIG. 23, oil delivered back through the inlet port 186 of the adapter 180 flows through the crankcase 178, back to the oil sump 64, before being pumped by the oil pump 68 out through the outlet port 188 to the external components 210. In some cases, an optional, cylindrically shaped adapter tube 192 may be required to couple the adapter 180 to internal components within the crankcase 178. The adapter tube 192 includes an annular recess 204 that receives a ring shape indexing land 202 on the body 182.

FIGS. 21A and 21B illustrate an alternate form of the adapter 180 in which a washer-like, circular perforated disc 191 is used rather than the spring 194. The perforated disc 191 includes a central circular opening 195 that is adapted to engage and seat against the ball 200, and a pair of outer arcuate perforations 193 on opposite sides of the circular perforation 195. The disc 191 has a diameter that is marginally less than that the outlet port 188. Under normal operating conditions, oil flowing through the outlet port 188 forces the ball 200 away from its valve seat, keeping the valve assembly 190 open. This normal oil flow moves the ball 200 toward the disc 191 and seats it against the circular opening 195. Although the ball 200 effectively closes the circular opening 195, oil is allowed to flow through the perforations 193 on opposite sides of the ball 200. In the event of oil backflow however, oil flowing back to the outlet port 188 moves the ball 200 away from the disc 191 and down onto its valve seat to prevent oil backflow into the oil pump 68.

Referring particularly now to FIGS. 21 and 22, the adapter 180 comprises an adapter body 182 provided with an inlet port 186 and an outlet port 188. The valve assembly 190 comprises a valve body 196 having a central, internally threaded passageway, a compression spring 194 and a valve ball 200 that seats within the outlet port 188 which is generally cylindrical in shape and communicates with the open end of the adapter body 182. As previously discussed, oil pumped through the crankcase 178 by the oil pump 68 flows into the inlet port 186 of the adapter 180 and out through the outlet port 188. When the oil is at the desired predetermined pressure, the oil pressure is sufficient to hold the ball 200 in its open, unseated position, overcoming loading applied by the spring 194, allowing oil to flow out through the outlet port 188 to the external components 210 (FIG. 23). Oil loops back from the external components 210 into the inlet port 186 of the adapter 180, back to the crankcase 178. In the event the oil pressure falls below a preselected value, the spring 194 forces the ball 200 against its valve seat, thereby closing the valve assembly 190 and preventing oil backflow into the oil pump 68.

Figure 24:
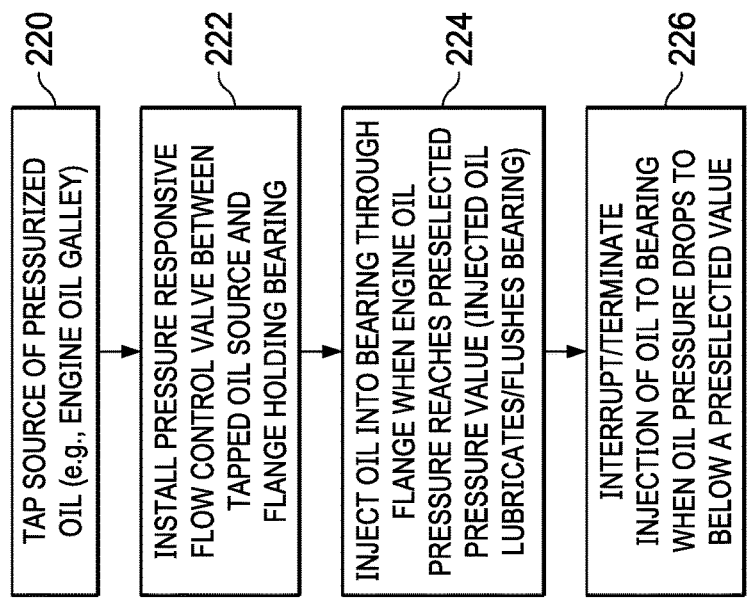
FIG. 24 is an illustration of a flow diagram of a method of lubricating a bearing in an internal combustion engine.

FIG. 24 broadly illustrates the overall steps of a method of controlling lubrication of a bearing in an internal combustion engine 30. At 220, a source of pressurized oil is tapped, such as oil galley 50 in the engine 30. At 222, a pressure responsive flow control valve 92 is installed between the tapped oil source and a flange 54 holding the bearing 80. At 224, oil is injected into the bearing 80 when engine oil pressure reaches a preselected pressure value. The resulting injection of oil both lubricates bearing 80 and flushes it of contaminants. The injection of oil into the bearing 80 is interrupted or terminated when the engine oil pressure drops to below the preselected pressure value.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for lubricating a bearing supporting a rotating layshaft in an internal combustion engine, comprising:
   a flange configured to be attached to the engine for mounting the bearing on the engine, the flange including an oil inlet port, and an oil outlet port configured to direct oil into the bearing;
   an oil delivery line configured to be coupled between a source of oil on the engine and the oil inlet port on the flange; and
   a flow control valve for controlling flow of oil from the oil outlet port to the bearing, the flow control valve including an oil pressure responsive valve assembly having a closed state preventing the flow of oil through the control valve and an open state allowing the flow of oil through the flow control valve.

2. The system of claim 1, wherein the pressure responsive valve assembly includes:
   a ball shiftable between a closed position blocking the flow of oil through the flow control valve, and an open position allowing the flow of oil through the flow control valve, and
   a spring biasing the ball toward the closed position thereof but yieldable to allow the ball to shift to the open position thereof when the oil from the oil source reaches a preselected pressure.

3. The system of claim 1, wherein the flow control valve is attached to the flange.

4. The system of claim 1, wherein the flow control valve is coupled in-line with the oil line between the oil source and the flange.

5. The system of claim 1, wherein the flow control valve includes a valve body, and the valve body is formed integral with the flange.

6. The system of claim 1, wherein:
   the oil inlet port includes female threads, and
   the flow control valve includes male threads allowing the flow control valve to be threaded into the female threads of the oil inlet port.

7. The system of claim 1, further comprising:
   an oil cooler coupled with the oil delivery line between the oil source and the flange for cooling the oil before delivery to the flange.

8. The system of claim 7, wherein the oil cooler includes a body formed of thermally conductive material and a plurality of cooling fins for conducting thermal energy to a surrounding environment.

9. A method of lubricating a ball bearing in an internal combustion engine, comprising:
   tapping a source of pressurized oil in the engine;
   installing a pressure responsive flow control valve between the source of pressurized oil and a flange holding the ball bearing;
   injecting oil into an open side in the ball bearing through an outlet port in the flange; and
   using the pressure responsive flow control valve to control injection of the oil through the outlet port into the open side of the ball bearing.

10. The method of claim 9, further comprising:
    passing the oil through an oil cooler before delivery of the oil from the pressurized oil source to the flange.

11. The method of claim 9, wherein installing the pressure responsive flow control valve includes mounting the pressure responsive flow control valve on the flange.

12. A method of lubricating a ball bearing in an internal combustion engine, wherein the ball bearing has a closed first side and an open second side defining a volume of space therebetween, the method comprising:
    tapping a source of pressurized oil in the engine;

installing a flange on the engine configured to mount the ball bearing thereon, wherein the flange has an oil inlet port and an oil outlet port facing the open second side of the ball bearing;

mounting the ball bearing on the flange, including orienting the oil outlet port to face the open second side of the ball bearing;

directing oil from the source of pressurized oil to the oil inlet port; and injecting pressurized oil into the volume of space within the ball bearing by directing the pressurized oil through the oil outlet port directly into the open second side of the ball bearing.

13. The method of claim 12, further including:

installing a pressure responsive flow control valve between the source of pressurized oil and the flange; and using the pressure responsive flow control valve to control flow of oil through the flange into the volume of space in the ball bearing.

14. A system for supporting a rotating layshaft in an internal combustion engine, comprising:

a ball bearing mounted on an end of the layshaft, the ball bearing having a closed first side and an open second side, the ball bearing including inner and outer races defining a volume of space therebetween, the ball bearing further including bearing balls disposed within the volume of space and captured between the inner and outer races;

a flange configured to be attached to the engine for mounting the ball bearing on the engine and wherein the open second side of the ball bearing is seated against and faces the flange, the flange including an oil inlet port, and an oil outlet port facing the open second side of the ball bearing, the oil outlet port being configured to inject pressurized oil directly into the open side of the ball bearing and onto the bearing balls, the oil outlet port being oriented and sized to cause the injected pressurized oil to move through the volume of space; and an oil delivery line configured to be coupled between a source of pressurized oil on the engine and the oil inlet port on the flange.

15. The system of claim 14, including a flow control valve responsive to engine oil pressure for controlling flow of pressurized oil from the oil outlet port to the bearing, and wherein the flow control valve includes an oil pressure responsive valve assembly having a closed state preventing the flow of oil through the control valve and an open state allowing the flow of oil through the control valve.

16. The system of claim 14, wherein the flow control valve is integrated into the flange and includes a valve body integral with the flange.

17. The system of claim 14, wherein the flow control valve is coupled in-line with the oil line between the oil source and the flange.

18. The system of claim 14, wherein the flange includes an oil passageway therein extending generally perpendicular to the oil inlet port and perpendicular to the open second side of the ball bearing.

19. A system for lubricating a ball bearing supporting a rotating layshaft in an internal combustion engine, comprising:

a flange configured to be attached to the engine for mounting the ball bearing on the engine, the flange including an oil inlet port configured to be coupled with a source of pressurized oil, an oil outlet port, and an internal oil passageway connecting the oil inlet port with the oil outlet port, wherein the oil outlet port is generally aligned with and faces the ball bearing for injecting oil into an interior of the ball bearing and thereby lubricate balls within the ball bearing; and an oil delivery line configured to be coupled between a source of oil on the engine and the oil inlet port on the flange.

20. The system of claim 19, wherein:

the ball bearing has a closed first side and an open second side, the oil passageway extends through the flange toward the open second of the ball bearing, the flange includes a land fitted against the ball bearing, and the oil outlet port is located in the land.

* * * * *